Jan. 9, 1940. P. P. POLKO ET AL 2,186,307
FLUID METER
Filed Feb. 8, 1937 5 Sheets-Sheet 4
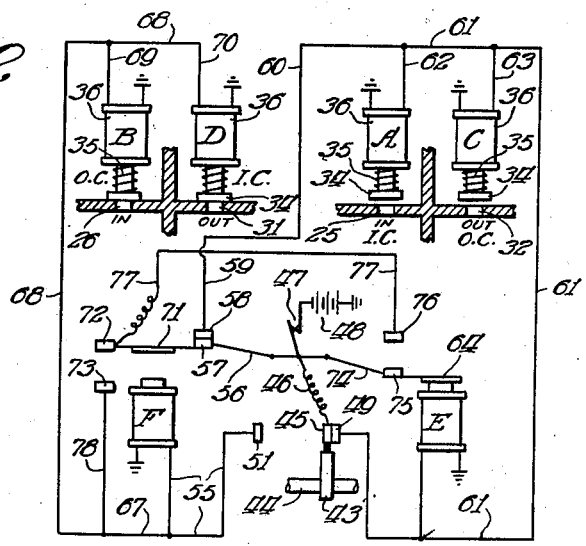
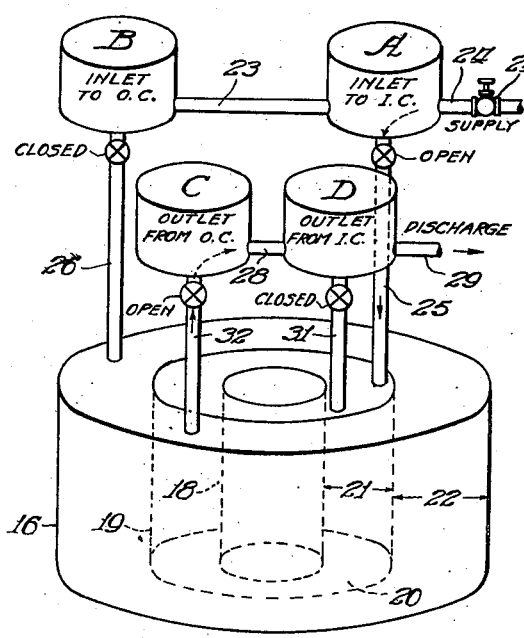
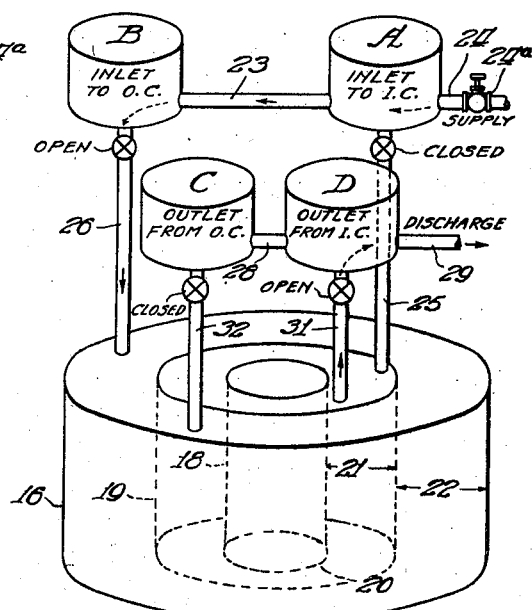
Inventors:
Peter Paul Polko and
William A. Lebus.
By:
Hill & Hill.
Witness:
V. Silgander Jan. 9, 1940.    P. P. POLKO ET AL    2,186,307
FLUID METER
Filed Feb. 8, 1937    5 Sheets-Sheet 5

Inventors:
Peter Paul Polko and
William A. Lebus.
By: Hill & Hill
Attys.

Witness:
V. Siljander

Patented Jan. 9, 1940

2,186,307

UNITED STATES PATENT OFFICE 2,186,307

FLUID METER

Peter Paul Polko, Lyons, and William Alexander Lebus, Chicago, Ill., assignors to Merritt C. Penticoff, Evanston, Ill.

Application February 8, 1937, Serial No. 124,586

9 Claims. (Cl. 73—268)

This invention relates to metering devices, and particularly to a device for metering fluids passing therethrough.

One object of the present invention is to provide a novel construction and arrangement whereby fluid may be accurately measured.

Another object of the invention is to provide a device wherein the volume of fluid passing therethrough at each cycle thereof may be varied as desired.

Another object of the invention is to provide a device for metering fluid under pressure, and wherein the passage of fluid through the device is automatically controlled by electrically actuated means controlled by the action of the fluid pressure.

Another object of the invention is to provide means for indicating the cycles of operation of the device.

Another object of the invention is to provide a metering device wherein the charging of one portion of the device acts to discharge another portion thereof.

A further object of the invention is to provide an automatic fluid metering device of novel construction, economical to manufacture, efficient in its operation and adapted for use wherever applicable.

A further object of the invention is to improve devices of the character described in sundry details hereinafter referred to and particularly pointed out in the appended claims.

One embodiment of the invention is shown for illustrative purposes in the accompanying drawings, in which Fig. 1 is an elevational view, partly in section, of a metering device embodying features of the present invention, the sectioned portion being viewed substantially as indicated by the line 1—1 of Fig. 2;

Figs. 6 and 7 are diagrammatic perspective views of the valve arrangement shown in different conditions of operation; and Figs. 8 to 12, inclusive, are electrical circuit diagrams illustrating the manner of automatically and electrically controlling various portions of the device when in operation.

Figure 1:
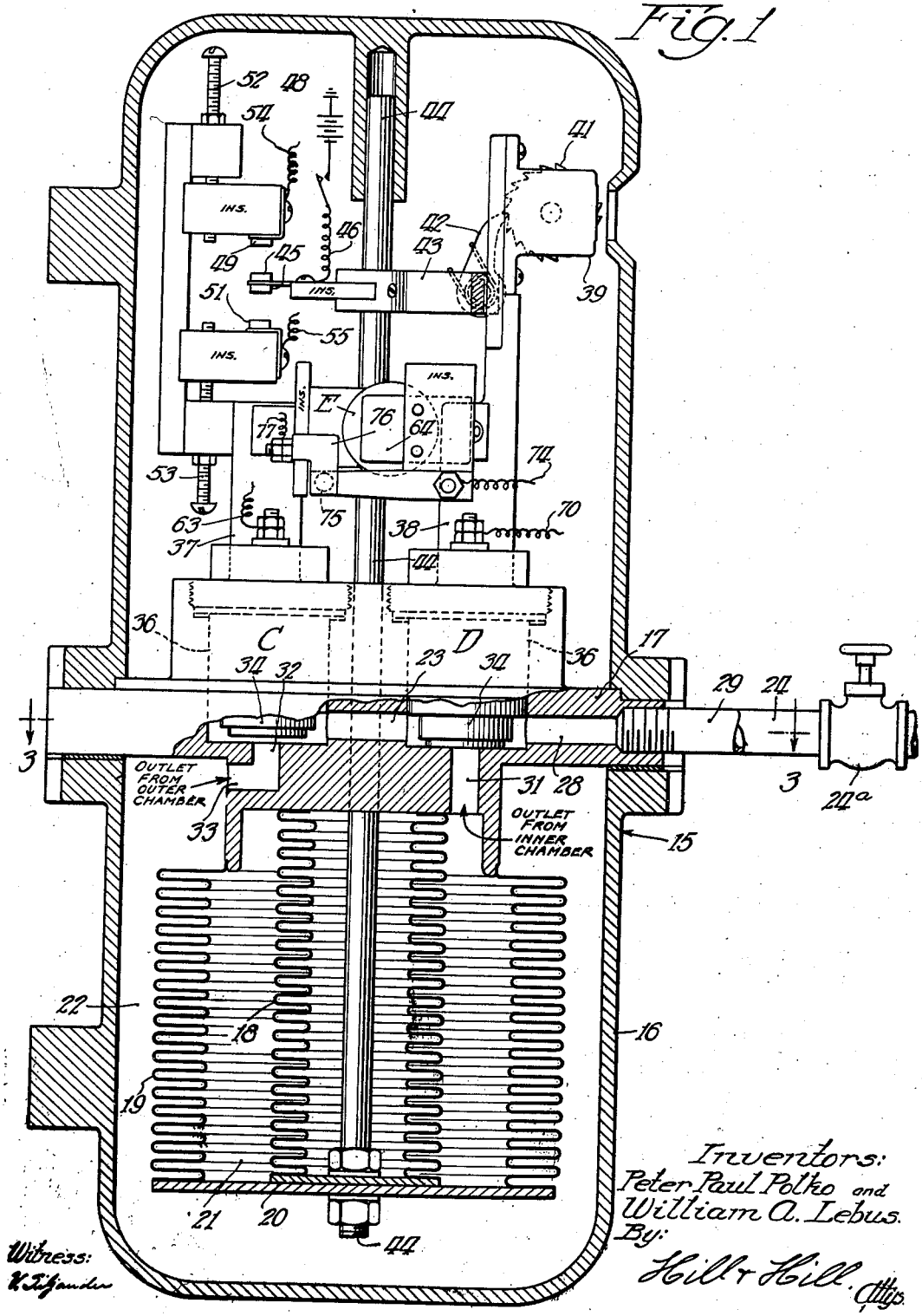

Referring to Figs. 1 to 7, inclusive, of the drawings, the present invention contemplates a housing indicated, as a whole, by the numeral 15 and comprising a cup-shaped casing 16 and a head 17 secured thereto adjacent the upper or open side thereof.

Secured to the underside of the head 17 and within the casing 16 are inner and outer diaphragms 18 and 19, respectively, preferably of the tubular "Sylphon" or bellows type, positioned one within another, and having a bottom portion 20 closing the lower ends of both diaphragms, the said diaphragms cooperating with each other and with the casing 16 and bottom 20, to provide inner and outer chambers 21 and 22, respectively, within the casing.

Formed in the head 17 is an intake passage or manifold 23 (Figs. 3, 4 and 5) communicating at its outer or receiving end with a supply conduit 24 for receiving fluid under pressure from a suitable source of fluid supply under control, if desired, of a manually operated valve 24a positioned in the conduit. Formed also in the head 17 is an inlet port 25 communicating with the intake passage 23 and with the inner chamber 21 (Figs. 4 and 5) formed within the casing 16 between the diaphragms 18 and 19, and communicating with the passage 23 adjacent its inner end portion is an inlet port 26 (Figs. 3 and 4) having a lateral extension 27 communicating with the outer chamber 22 formed between the outer diaphragm 19 and the casing 16.

Formed in the head 17 at the opposite side of the center line thereof from the intake passage 23 is an outlet or discharge passage or manifold 28 (Fig. 3) communicating at its outer or discharge end with a discharge conduit 29. The passage 28 also communicates intermediate its ends with an outlet port 31 formed in the head 17 communicating with the inner chamber 21, and adjacent the inner end portion of the outlet passage 28 is an outlet port 32 communicating with the passage 28 and having a lateral extension 33 communicating with the outer chamber 22, see Figs. 1, 3 and 5.

Each of the inlet ports 25 and 26, and the outlet ports 31 and 32 are controlled, respectively, by magnetically actuated valves indicated, as a whole, and respectively by the characters A, B, D and C, the said valves comprising valve members 34 adapted to be urged toward port-closing position by springs 35 (Fig. 4) and moved to open position by the energizing of magnetic coils 36 associated with the respective valve members.

By referring particularly to the diagrammatic views of Figs. 6 and 7, it is believed that a clear and comprehensive understanding of the principle of operation of the device may be obtained. For convenience and due to lack of space on the drawings, "I.C." is intended to refer to the inner chamber 21, and "O.C." to the outer chamber 22. Assuming that the outer chamber 22 has been previously charged with fluid, and having in mind that the fluid to be metered and received from the source of fluid supply through the supply conduit 24 is under suitable pressure, it will be noted by reference to Fig. 6, for example, that the inlet valve A communicating with the passage 23 and leading to the inner chamber 21 is open and that the inlet valve B also communicating with the passage 23 and leading to the outer chamber 22 is closed. It will be observed also that the outlet valve C leading from the outer chamber 22 into the discharge passage 28 is open, and that the outlet valve D leading from the inner chamber 21 into the discharge passage 28, also, is closed. By such an arrangement of the valves A, B, C and D, it will be apparent that fluid under pressure entering the inner chamber 21 between the diaphragm 18 and 19 through the valve A and inlet port 25 will cause the expansion of both diaphragms thereby reducing the capacity of the outer chamber 22 and discharging the fluid therefrom through the outlet port 32 and open outlet valve C into the discharge passage or manifold 28, thence around the closed valve D and into the discharge conduit 29.

Upon completing the discharge of fluid from the outer chamber, or so much thereof as may be desired, and as may be determined by mechanism and devices hereinafter described, the condition of the valves A, B, C and D are reversed by the operation of suitable mechanism and electrical devices also hereinafter described, in other words, as shown in Fig. 7, the valve A is closed, B is opened, C is closed and D is opened. By such an arrangement of the valves, it will be apparent that fluid under pressure entering the outer chamber 22 through the valve B and inlet port 26 will cause the compression or contraction of both diaphragms 18 and 19 thereby reducing the capacity of the inner chamber 21 and discharging the fluid therefrom through the outlet port 31 and outlet valve D, and thence into the conduit 29, thus completing one full cycle of the device, after which, the operation is repeated.

Figure 2:
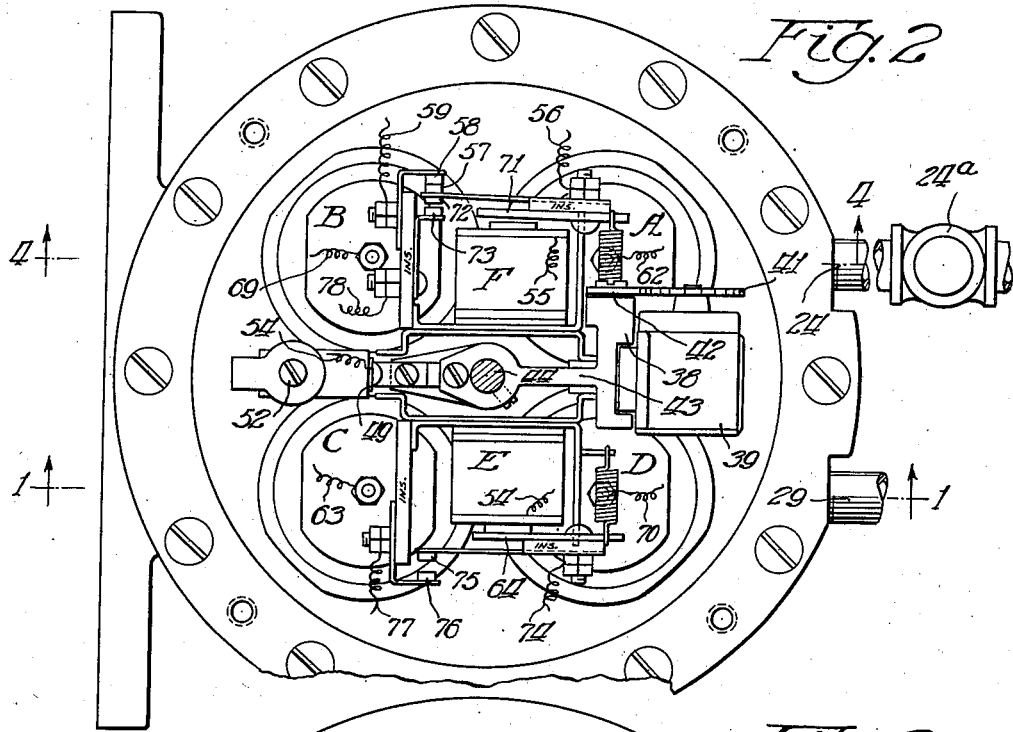
Fig. 2 is a plan view of the device shown in Fig. 1 with the cover removed.
Figure 3:
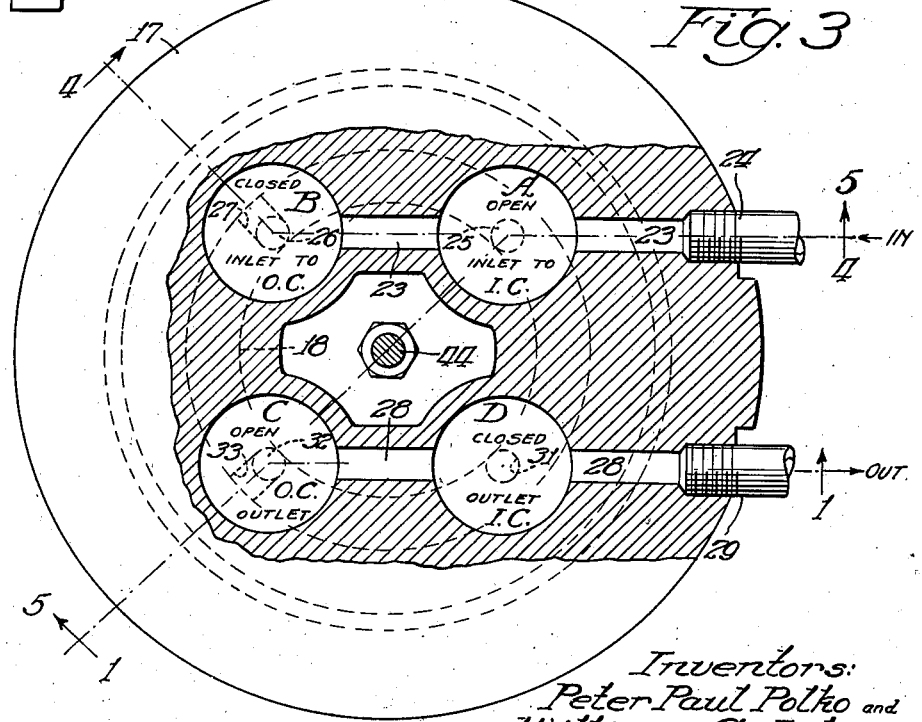
Fig. 3 is a plan sectional view taken as indicated by the line 3—3 of Fig. 1.
Figure 4:
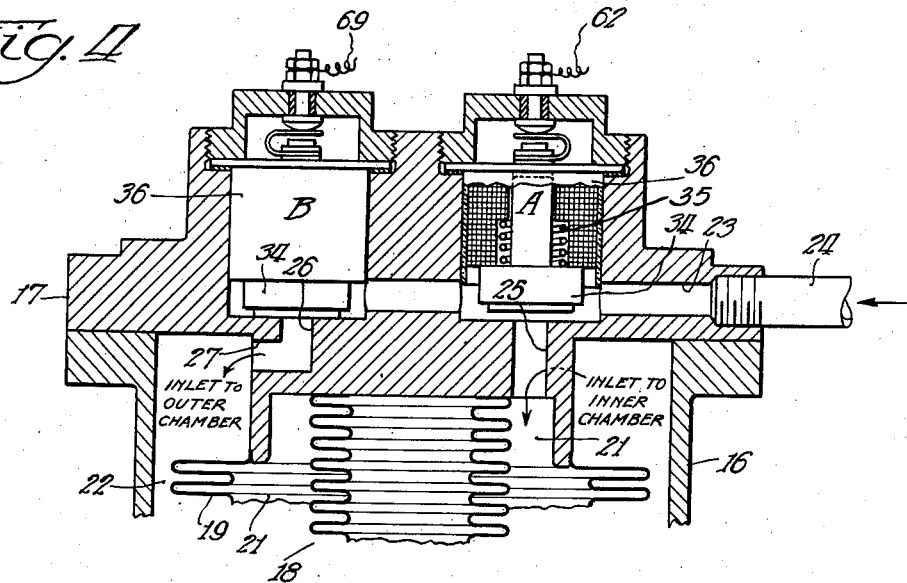
Fig. 4 is a fragmentary sectional elevational view through certain of the valve arrangements, and taken substantially as indicated by the lines 4—4 of Figs. 2 and 3.
Figure 5:
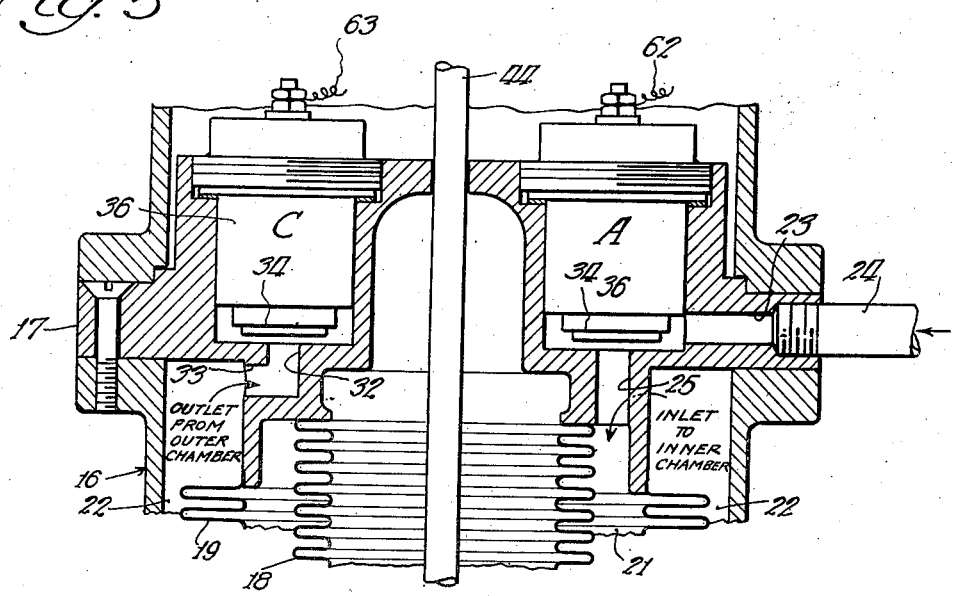
Fig. 5 is a fragmentary sectional elevational view through certain other of the valve arrangement and taken substantially as indicated by the line 5—5 of Fig. 3.

Referring to Figs. 1 and 2, it will be observed that the head 17 is provided with a pair of upright supports 37 and 38, the support 38 being provided adjacent its upper end portion with an indicator or counter 39 of a well known type having a rotatable ratchet wheel 41 connected to its operating mechanism and adapted to be rotated intermittently by a pawl 42 pivotally mounted on a bracket 43 secured to a vertically movable actuating member 44 slidably mounted in the head 17 and having its lower end portion secured to the bottom 20 of the diaphragms 18 and 19 in a manner to be reciprocated thereby when the diaphragms are expanded and contracted by the passage of fluid through the chambers 21 and 22 in the manner above described with reference to Figs. 6 and 7. It will be observed that by such an arrangement, each upward movement of the bottom 20 and actuating member 44, due to the charging of the outer chamber 22 and the discharging of the inner chamber 21, will cause the pawl 42 to rotate the ratchet wheel 41 of the indicator 39 one step for registering each complete cycle of the charging and discharging operations of the device, and by knowing the amount of fluid discharged by the device during one complete cycle thereof, it is simple, by referring to the indicator 39, to ascertain the quantity of fluid passing through the device during a definite period of time.

For actuating the respective valves A, B, C and D in proper sequence and in proper relation to the movements of the diaphragms 18 and 19, an electrical contact member 45 is mounted on and insulated from the bracket 43 carried by and movable with the actuating member 44, the movable contact member 45 being connected by means of a conductor 46 and switch 47 to a suitable source of electrical energy shown, in the present instance, as a battery 48. The movable contact member 45, as shown in Figs. 1 and 8 to 12, inclusive, is movable between, and alternately engageable with a pair of normally fixed or stationary contact members 49 and 51 mounted on the upright support 37, and relatively adjustable with respect to the support and to each other by means of adjusting screws 52 and 53, the contacts 49 and 51 being connected, respectively, to relay coils E and F by means of conductors 54 and 55, respectively. By adjustment of the screws 52 and 53, the volume of fluid passing through the device per cycle may be varied throughout a wide range.

Figure 8:
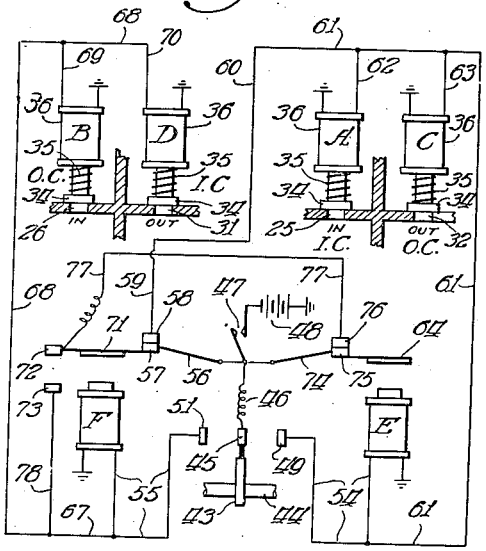

It is believed that a fuller and more complete understanding of the present invention and operation thereof, as a whole, will be best understood by reference to the diagrammatic views of Figs. 6 and 7, and the circuit diagrams illustrated in Figs. 8 to 12, inclusive, where, in Fig. 8, for example, the switch 47 is shown in open position and all of the valve members 34 are seated in a manner to close the inlet ports 25 and 26, and the outlet ports 31 and 32, it being understood that the valve 24a in the supply conduit 24 is also closed.

Figure 9:
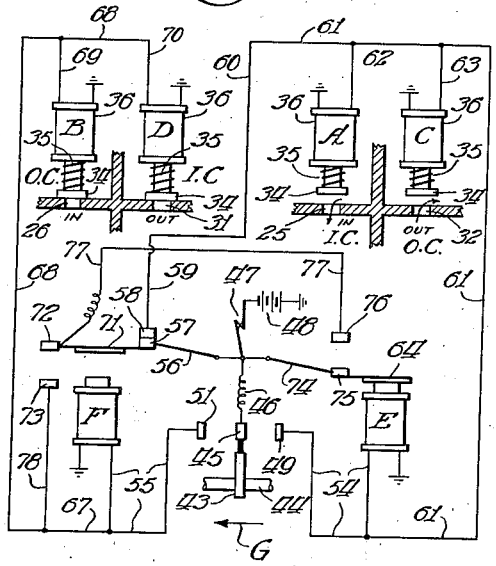

Assuming for example that the switch 47 and valve 24a are interconnected so that upon opening the valve 24a, the switch 47 is closed, a circuit may be traced through a conductor 56, movable contact 57, stationary contact 58, conductors 59, 60, 61 and 62 to energize the magnetic coil 36 of the valve A to open the inlet port 25 and admit fluid under pressure to the inner chamber 21, and through a conductor 63 to energize the coil 36 of the valve C and open the outlet port 32 leading from the outer chamber 21 as shown in Figs. 6 and 9, the entering of fluid under pressure into the inner chamber 21 causing the diaphragms 18 and 19 to expand, thereby moving the contact member 45 toward the stationary contact 51 as shown by the direction arrow G in Fig. 9. Simultaneously with the establishing of a circuit to open the valves A and C, the conductor 61 in conjunction with a portion of the conductor 54 completes a circuit through the relay coil E to attract an armature 64 and maintains the coil E in energized condition during the movement of the contact 45 toward the contact 51 and until the contact 45 engages the contact 51 as shown in Fig. 10.

Figure 10:
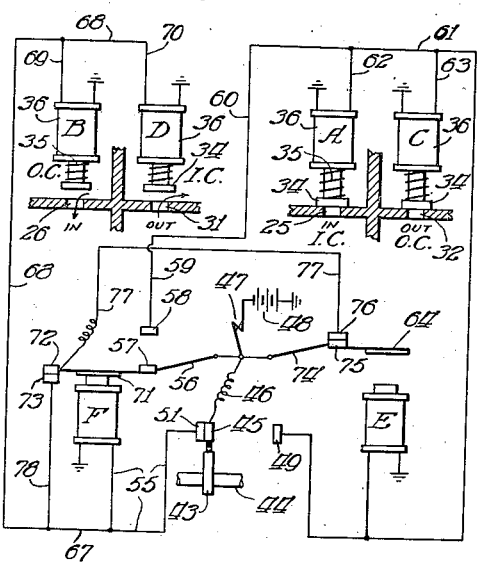

Immediately upon engagement of the movable contact 45 with the contact 51 as illustrated in Fig. 10, a circuit is established through the conductor 46, contacts 45 and 51, and conductors 55, 67, 68 and 69 to energize the magnetic coil 36 of the valve B and open the inlet port 26 to admit fluid under pressure to the outer chamber 22, and through a conductor 70 to energize the coil 36 of the valve D and open the outlet port 31 leading from the inner chamber 21 as shown in Fig. 10. Under the conditions above described as shown in Fig. 10, the relay coil F is energized through the conductor 55 to attract an armature 71 carrying a contact 72 into engagement with a contact 73 to establish another circuit through the relay coil F by means of a conductor 74, contacts 75 and 76, conductor 77, contacts 72 and 73 and conductors 78, 67 and 55. With the opening of the valves B and D, and the energizing of the coil F, the contacts 57 and 58 are separated thereby breaking the circuits through the magnets of the valves A and C and the relay coil E permitting the valve members 34 of the valves A and C to close the ports 25 and 32 under the influence of the springs 35.

Figure 11:
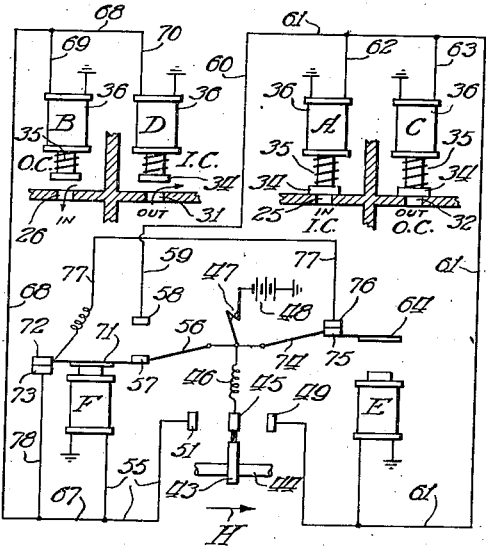

The admission of fluid under pressure into the outer chamber 22 acts to compress or contract the diaphragms 18 and 19 thereby moving the contact 45 away from the contact 51 and toward the contact 49 as indicated by the direction arrow H in Fig. 11, and during such movements, the valves B and D are maintained in open condition as shown in Figs. 10 and 11 by reason of the energizing of the relay coil F through the contacts 72 and 73.

When the movable contact 45 engages the contact 49 as shown in Fig. 12, the relay coil E is again energized and attracts the armature 64 thereby separating the contacts 75 and 76, and breaking the circuit through the contacts 72 and 73 to de-energize the coils 36 of the valves B and D and to de-energize the relay coil F and permit the contact 57 to again engage the contact 58 in a manner to establish a circuit through the coils 36 of the valves A and C to again open the inlet port 25 and outlet port 32 as described with relation to the diagram shown in Fig. 9, after which the operation of the device is repeated so long as the valve 24a remains open and the switch 47 remains closed.

It will be observed from the foregoing description that the present invention provides a novel construction and arrangement whereby fluids under pressure may be accurately metered, and wherein the passage of fluid through the device is automatically controlled by electrically actuated means governed by the action of the fluid pressure in the operation of the device, also that the present invention provides novel means whereby the charging of one portion of the device acts to discharge another portion thereof, and the present invention also provides means for indicating the cycles of operation, and wherein the volume of fluid passing through the device at each cycle thereof may be varied as desired.

Obviously, the present invention is not limited to the precise construction and arrangement shown and described, as the same may be variously modified. Moreover, all the features of the invention need not be used conjointly as the same may be used in variously different combinations and sub-combinations.

What we claim as new and desire to secure by Letters Patent is:

1. In a device of the kind described and in combination, a housing, a plurality of diaphragms rigidly mounted adjacent one of their ends in said housing and forming inner and outer chambers in the housing, said housing having a plurality of inlet ports and outlet ports operatively related, respectively, to fluid supply and discharge conduits, each of said inlet ports and each of the outlet ports communicating, respectively, with said inner and outer chambers, and a plurality of electrically controlled valves associated, respectively, with said ports for controlling the passage of fluid therethrough, and means having a portion thereof connected to said diaphragms and movable therewith in opposite directions for actuating said valves.

2. In a device of the kind described and in combination, a housing, a plurality of diaphragms therein, each having a fixed end portion and forming inner and outer chambers in the housing, said housing having a plurality of inlet ports and outlet ports operatively related, respectively, to fluid supply and discharge conduits, each of said inlet ports and each of the outlet ports communicating, respectively, with said inner and outer chambers, electrically controlled valves associated, respectively, with said ports for controlling the passage of fluid therethrough, and means operatively related to said diaphragms for controlling the operation of said valves.

3. In a device of the kind described and in combination, a housing, a plurality of diaphragms having a common bottom portion mounted therein and forming inner and outer chambers in the housing, said housing having a plurality of inlet ports and outlet ports operatively related, respectively, to fluid supply and discharge conduits, each of said inlet ports and each of the outlet ports communicating, respectively, with said inner and outer chambers, electrically controlled valves associated, respectively, with said ports for controlling the passage of fluid therethrough, an indicator mounted on said housing, and an actuating member operatively connected to said diaphragms in a manner to be moved thereby and operatively related to said indicator for registering the movements of said diaphragms, and means controlled by said diaphragms for controlling the operation of said valves.

4. In a device of the kind described and in combination, a housing, a plurality of diaphragms having a common bottom portion mounted therein and forming inner and outer chambers in the housing, said housing having a plurality of inlet ports and outlet ports operatively related, respectively, to fluid supply and discharge conduits, each of said inlet ports and each of the outlet ports communicating, respectively, with said inner and outer chambers, electrically controlled valves associated, respectively, with said ports for controlling the passage of fluid therethrough, an indicator mounted on said housing, an actuating member operatively connected to said diaphragms in a manner to be moved thereby and operatively related to said indicator for registering the movements of said diaphragms, and electrically actuated means operatively related to said member for controlling the operation of said valves to alternately charge and discharge said chambers.

5. In a device of the kind described and in combination, a housing, a pair of tubular diaphragms positioned one within another and having substantially a common bottom portion, said diaphragms being mounted adjacent their upper ends in said housing and providing inner and outer chambers therein, said housing having a pair of connected inlet ports communicating, respectively, with said inner and outer chambers and with a fluid supply conduit, said housing also having a pair of connected outlet ports communicating, respectively, with said inner and outer chambers and with a discharge conduit, electrically controlled valves operatively related, respectively, to each of the inlet and outlet ports, electrically operated relays for controlling said valves, an actuating member connected to the bottom portion of said diaphragms and extending outwardly from said housing, a source of current supply, and means on said actuating member connected to said source of supply and operatively related to said relays for controlling the operation thereof and the position of the respective valves.

6. In a device of the kind described and in combination, a housing comprising a casing and a head therefor, a pair of tubular diaphragms positioned one within another and having their upper end portions secured to said head, a bottom portion substantially common to both diaphragms adjacent their lower ends, said diaphragms providing inner and outer chambers in said housing, said head having a pair of connected inlet ports formed therein communicating, respectively, with said inner and outer chambers and with a fluid supply conduit, said head also having a pair of connected outlet ports communicating, respectively, with said inner and outer chambers and with a discharge conduit, electrically controlled valves operatively related, respectively, to each of the inlet and outlet ports, electrically operated relays for controlling said valves, an actuating member connected to the bottom portion of said diaphragms within said inner diaphragm and extending outwardly from said housing through said head, a source of current supply, and means on said actuating member connected to said source of supply and operatively related to said relays for controlling the operation thereof and the position of the respective valves in relation to said inlet and outlet ports.

7. In a device of the kind described and in combination, a housing, a plurality of diaphragms therein forming inner and outer chambers, said housing having a pair of inlet ports formed therein communicating, respectively with said inner and outer chambers and with a fluid supply conduit, and having a pair of outlet ports communicating, respectively, with said inner and outer chambers and with a discharge conduit, means for controlling the passage of fluid through said ports to alternately charge and discharge said chambers, said means comprising a plurality of magnetically actuated valves operatively related, respectively, to said ports, a pair of electrically operated relays and an indicator mounted on said housing, an actuating member operatively connected to said diaphragms and movable thereby, a pair of adjustably spaced relatively fixed contacts mounted on said housing, a source of current supply operatively related to the coils of said valves and to said fixed contacts and the coils of said relays, means on said actuating member for operating said indicator, and a movable contact on said actuating member connected to said source of current supply and engaging alternately with said fixed contacts for alternately actuating said relays to energize a pair of valve magnets to open the inlet port of the inner chamber and the outlet port of the outer chamber when the movable contact engages one of said fixed contacts, and to de-energize said last mentioned coils and energize another pair of valve magnets to open the inlet port of the outer chamber and outlet port of the inner chamber when said movable contact engages the other of said fixed contacts.

8. In a device of the kind described and in combination, a housing, a plurality of diaphragms therein forming a pair of chambers in the housing, said housing having a plurality of inlet ports and outlet ports communicating, respectively, with fluid supply and discharge conduits, each of said inlet ports and each of said outlet ports communicating, respectively, with the respective chambers, a plurality of electrically controlled valves associated with said ports for controlling the passage of fluid therethrough, an electrical circuit for the valves operatively related to one of the inlet ports and one of the outlet ports communicating with the respective chambers, a second electrical circuit for the valves operatively related to the other of the inlet ports and the other of the outlet ports communicating with the respective chambers, electrically operated relays carrying contacts operatively related to the respective circuits and operable to open and close said circuits for controlling said valves, a pair of relatively spaced contacts operatively related, respectively, to actuating devices for operating said relays and to the valve actuating devices of the respective circuits, an actuating member operatively related to said diaphragms in a manner to be moved thereby and having a movable contact adapted to engage said spaced contacts for actuating the valves operatively related to the inlet ports and outlet ports communicating with the respective chambers.

9. In a device of the kind described and in combination, a housing, a plurality of diaphragms therein forming a pair of chambers in the housing, said housing having a plurality of inlet ports and outlet ports communicating, respectively, with fluid supply and discharge conduits, each of said inlet ports and each of said outlet ports communicating, respectively, with the respective chambers, and a plurality of electrically controlled valves associated with said ports for controlling the passage of fluid therethrough, an electrical circuit for the valves operatively related to one of the inlet ports and one of the outlet ports communicating with the respective chambers, a second electrical circuit for the valves operatively related to the other of the inlet ports and the other of the outlet ports communicating with the respective chambers, electrically operated relays carrying contacts operatively related to the respective circuits and operable to open and close said circuits for controlling the operation of said valves, a pair of relatively spaced contacts operatively related, respectively, to actuating devices for operating said relays and to the valve actuating devices of the respective circuits, an actuating member operatively related to said diaphragms in a manner to be moved thereby and having a movable contact adapted to alternately engage said spaced contacts for alternately actuating the valves operatively related to the inlet ports and outlet ports communicating with the respective chambers, and a holding circuit operatively related to said relays and to said first mentioned and second circuits for maintaining the respective circiuts in operative condition during the movement of said movable contact carried by the actuating member between said relatively spaced contacts.

PETER PAUL POLKO.
WILLIAM ALEXANDER LEBUS.